US006553423B1

(12) United States Patent
Chen

(10) Patent No.: US 6,553,423 B1
(45) Date of Patent: Apr. 22, 2003

(54) METHOD AND APPARATUS FOR DYNAMIC EXCHANGE OF CAPABILITIES BETWEEN ADJACENT/NEIGHBORING NETWORKS NODES

(75) Inventor: Enke Chen, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/321,782

(22) Filed: May 27, 1999

(51) Int. Cl.$^7$ .............................................. G06F 15/16
(52) U.S. Cl. ........................ 709/230; 709/238; 370/401
(58) Field of Search .................................. 709/238, 230, 709/227, 228, 229, 231, 232, 233, 234; 370/401, 402, 389

(56) References Cited

U.S. PATENT DOCUMENTS

| | | | | |
|---|---|---|---|---|
| 5,361,256 A | * | 11/1994 | Doeringer et al. ............. | 370/60 |
| 5,754,547 A | * | 5/1998 | Nakazawa ................... | 370/401 |
| 5,802,316 A | * | 9/1998 | Ito et al. ...................... | 709/238 |
| 6,052,718 A | * | 4/2000 | Gifford ........................ | 709/219 |
| 6,097,718 A | * | 8/2000 | Bion ........................... | 370/351 |
| 6,148,410 A | * | 11/2000 | Baskey et al. ................. | 714/4 |
| 6,269,099 B1 | * | 7/2001 | Borella et al. ............... | 370/389 |

OTHER PUBLICATIONS

Y. Rekhter, Mar. 1995, Network Working Group, Request For Comments (RFC): 1771, 32.*
Chandra, Ravi and John Scudder, World Wide Web page http://www.ietf.org/internet–drafts/draft–ietf–idr–bgp4–cap–neg–03.txt, "Capabilities Negotiation with BGP–3", posted Mar. 10, 1999, pp. 1–4.
Chen, Enke, World Wide Web page http://www.search.ietf.org/internet–drafts–chen–bgp–route–refresh–01.txt, "Route Refresh Capability for BGP–4", posted Apr. 2, 1999, pp. 1–4.
Tony Bates, et al., World Wide Web page http://www.search.ietf.org/internet–drafts/draft–ietf–idr–bgp4–multiprotocol–v2–02.txt, "Multiprotocol Extensions for BGP–4", posted Apr. 2, 1999, pp. 1–10.
Perlman, Radia, "Interconnections: Bridges and Routers", Copyright 1992, pp. 323–329.
Cisco IOS Release 11.3, "Network Protocols Configuration Guide, Part 1", Copyright 1997, pp. P1C–160–P1C–161.
Y. Rekhter, et al., World Wide Web page http://www.ietf.org/internet–drafts/draft–ietf–idr–bgp4–08.txt, "A Border Gateway Protocol 4 (BGP–4)", posted Mar. 10, 1999, pp. 1–54.
World Wide Web page http://www.cisco.com/univercd/cc/t...s120/12cgcr/np1_c/1cprt1/1cbgp/htm, posted Feb. 9, 1999, "Configuring BGP", pp. 1–44.
World Wide Web page http://www.optimized.com/COMPENDI/IP–Routg.htm, "IP Routing: Understanding Routing with IP", posted Sep. 27, 1999, pp. 1–3.

* cited by examiner

Primary Examiner—Dung C. Dinh
Assistant Examiner—Isaac Woo
(74) Attorney, Agent, or Firm—Cesari and McKenna, LLP

(57) ABSTRACT

A technique to dynamically exchange or update routing capabilities between neighboring peer routers in a computer network without disruption to the operation of the routers. A dynamic capability parameter in an Open message of a Border Gateway Protocol (BGP) enables a router to announce a new capability, or revise or remove a previously announced capability, to a neighboring router when a peer connection is established between the routers. Once announced, the dynamic capability allows the router to exchange a capability message containing updates of capabilities without the need for resetting the existing peer connection. As a result, the technique allows non-disruptive configuration and enabling of capabilities in a manner that improves network stability, while reducing interruption of network services.

26 Claims, 5 Drawing Sheets

METHOD AND APPARATUS FOR DYNAMIC EXCHANGE OF CAPABILITIES BETWEEN ADJACENT/NEIGHBORING NETWORKS NODES

FIELD OF THE INVENTION

This invention relates generally to computer networks, and more particularly, to routing protocols in a computer network.

BACKGROUND OF THE INVENTION

A computer network is a geographically distributed collection of interconnected communication links for transporting data between nodes, such as computers. Many types of computer networks are available, with the types ranging from local area networks (LANs) to wide area networks (WANs). The nodes typically communicate by exchanging discrete frames or packets of data according to pre-defined protocols, such as the Transmission Control Protocol/Internet Protocol (TCP/IP). In this context, a protocol consists of a set of rules defining how the nodes interact with each other. The TCP/IP architecture is well-known and described in *Computer Networks, 3rd Edition,* by Andrew S. Tanenbaum, published by Prentice-Hall (1996).

Computer networks may be further interconnected by an intermediate node, such as a router, to extend the effective "size" of each network. Since management of a large system of interconnected computer networks can prove burdensome, smaller groups of computer networks may be maintained as autonomous systems or routing domains. The networks within a routing domain are typically coupled together by conventional "intra-domain" routers. Yet is still may be desirable to increase the number of nodes capable of exchanging data; in this case, interdomain routers executing interdomain routing protocols are used to interconnect nodes of the various autonomous systems.

An example of an interdomain routing protocol is the Border Gateway Protocol (BGP-4) which performs routing between autonomous systems by exchanging routing and reachability information among neighboring interdomain routers of the systems. The BGP-4 routing protocol is well-known and described in detail in *Request For Comments (RFC) 1771,* by Y. Rekhter and T. Li (1995), *Internet Draft<draft-ietf-idr-bgp4-08.txt>titled, A Border Gateway Protocol 4 (BGP-4)* by Y. Rekhter and T. Li (August 1998) and *Interconnections, Bridges and Routers,* by R. Perlman, published by Addison Wesley Publishing Company, at pages 323–329 (1992), all disclosures of which are hereby incorporated by reference.

The interdomain routers configured to execute the BGP-4 protocol, referred to herein as BGP routers, perform various routing functions including transmission of routing messages. Before transmitting such messages, however, the BGP neighbors cooperate to establish a logical "peer" connection (session) between the routers. BGP-4 generally operates over a reliable transport protocol, such as TCP, to establish a TCP connection. Specifically, a TCP process executing on each neighboring peer router establishes the TCP connection in accordance with a conventional "3-way handshake" arrangement involving the exchange of TCP packet or segment data structures. The TCP protocol and establishment of a TCP connection are described in *Computer Networks, 3rd Edition,* particularly at pgs. 521–542.

FIG. 1 is a schematic block diagram of the format of a TCP segment 100 which includes a source port field 102 containing a 16-bit source port number and a destination port field 104 containing a 16-bit destination port number. The BGP-4 protocol preferably uses TCP port number 179 to establish a TCP connection; the source port number is used by a receiving peer router (i.e., a BGP receiver) to reply to a TCP segment issued by a sending peer router (i.e., a BGP sender). A sequence number field 106 contains a sequence number of a first data byte in the segment and an acknowledgment number field 108 contains a value indicating the next sequence number that the receiver expects to receive. Note that the value contained in field 108 is valid only when an acknowledgment control bit (ACK 110) is asserted. In addition to the ACK bit 110, the TCP segment 100 includes other control bits such as a finish bit (FIN 112) denoting the end of data transmitted from the sender. Termination (closing) of the TCP connection is done implicitly by sending a TCP segment with an asserted FIN bit 112.

Once the TCP connection is established, the neighboring peer routers exchange messages to open and confirm various parameters associated with the connection. For example, a first message exchanged by the routers is an OPEN message which opens a BGP communication session between the peers. The OPEN message is thereafter confirmed by a KEEPALIVE message issued by a BGP router to notify its neighboring peer router that it is "alive" and active. The OPEN message data structure is essentially a means for the routers to identify themselves at the beginning of the neighboring peer relationship. The formats and functions of the KEEPALIVE and OPEN messages, the latter including the optional parameter field, are described in *RFC* 1771 and *Internet Draft <draft-ietf-idr-bgp4-08.txt>.*

FIG. 2 is a schematic block diagram of the format of an OPEN message 200 which includes a fixed-size BGP header 210 prepended to various message fields. The OPEN message fields comprise a version field 212 containing a BGP version number, an autonomous system field 214 containing the autonomous system number of the sender, a BGP identifier field 216 containing a BGP identifier (e.g., an IP address) of the sender and an optional parameters field 300 containing a list of optional parameters (if any). FIG. 3 is a schematic block diagram of the format of the optional parameters field 300 comprising a type subfield 302, a length subfield 304 and a variable-length value subfield 306. An example of an optional parameter is a capabilities parameter used to introduce new features that are supported by a BGP router.

In general, each interdomain (BGP) router has certain routing capabilities that may be related to its operation, including the types of messages it is able to process. Such capabilities are announced when the router establishes a peer relationship via a TCP connection with a neighboring BGP router. For example, a BGP sender may announce its ability to support address families such as IPv4 unicast and multicast messages through the use of the capabilities optional parameters in the OPEN message 200. The BGP receiver of the OPEN message is thus informed that it is safe to exchange messages related to IPv4 unicast and IPv4 multicast address families with the sender.

However in order to enable a new capability, or revise or remove an announced capability, the established TCP connection between the neighboring peer routers must be reset (i.e., closed and reopened) thereby disrupting existing services and operations of the routers. For example after the OPEN and KEEPALIVE messages are exchanged between the peer routers, an initial data flow involves the transmission of an entire BGP routing table between the routers. Closing and reopening of the TCP connection results in a loss of connectivity between the routers which, in turn, may require the retransmission of the contents of the routing table.

Therefore, it is an object of the present invention to provide an improved method for routing protocols in which a non-disruptive update of routing capabilities can be performed.

SUMMARY OF THE INVENTION

The present invention comprises a technique for dynamically exchanging or updating routing capabilities between neighboring peer routers in a computer network without disruption to the operation of the routers. According to the invention, a new dynamic capability parameter is provided that enables a router to announce a new capability, or revise or remove a previously announced capability, to a neighboring router when a peer connection is established between the routers. Once announced, the dynamic capability parameter facilitates graceful capability changes between neighboring routers by allowing the routers to exchange a novel capability message. In the illustrative embodiment, the capability message includes, inter alia, a capability action code that has the following defined values: (1) announce (i.e., add) a new capability; (2) replace a previous announced capability; and (3) withdraw (i.e., delete) a previously announced capability.

Advantageously, the dynamic capability identifies the BGP speaker as being capable of receiving this BGP capability message after the BGP session has been established. Moreover, the novel capability message dynamically announces updates of capabilities without the need for resetting the existing peer connection. As a result, the inventive technique allows non-disruptive configuration and enabling of capabilities in a manner that improves network stability and reduces interruption of network services.

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF AN ILLUSTRATIVE EMBODIMENT

Figure 1:
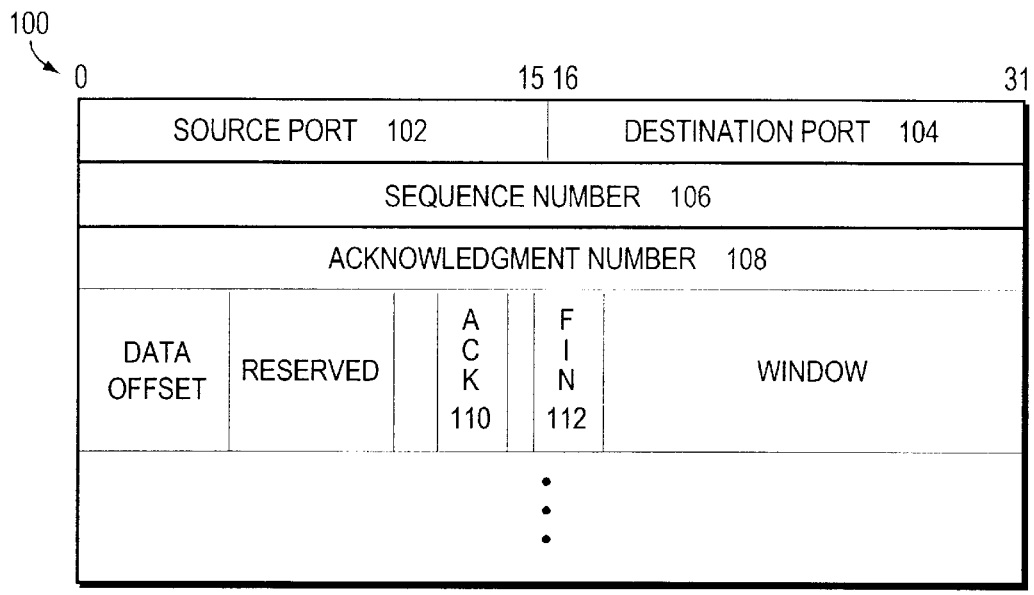
FIG. 1 is a prior art schematic block diagram of the format of a Transmission Control Protocol (TCP) segment used to establish a TCP connection between neighboring peer routers of a computer network.
Figure 2:
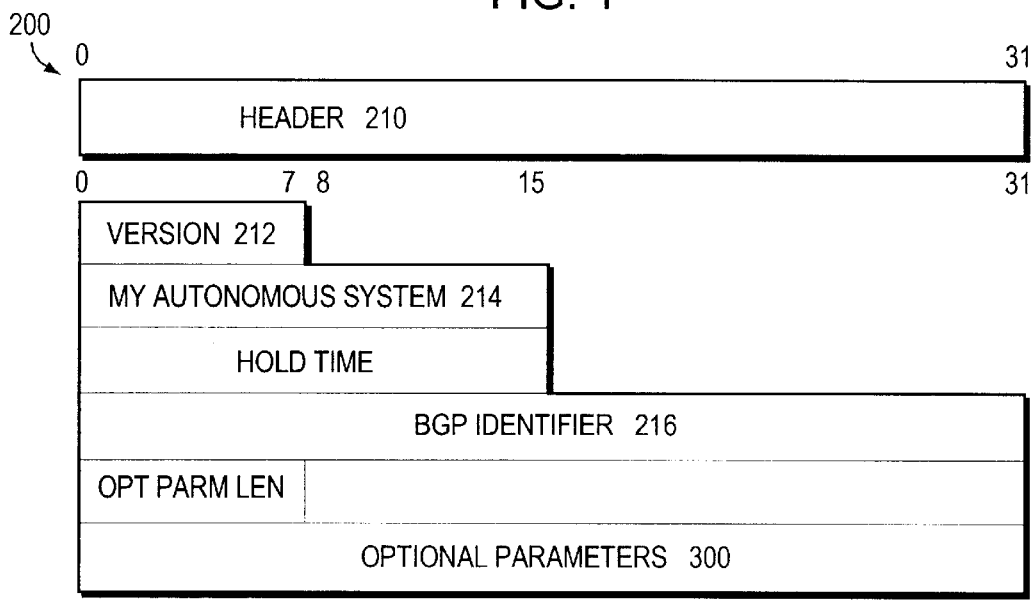
FIG. 2 is a prior art schematic block diagram of the format of an OPEN message used to open a communication session over a TCP connection between neighboring peer routers, such as Border Gateway Protocol (BGP-4) peer routers.
Figure 3:
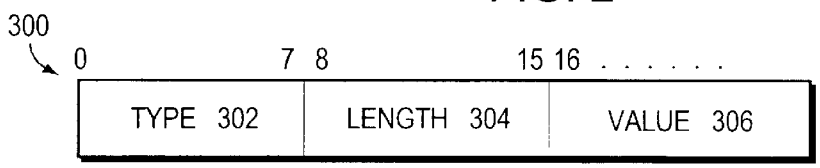
FIG. 3 is a prior art schematic block diagram of the format of an optional parameters field contained in the OPEN message of FIG. 2.
Figure 4:
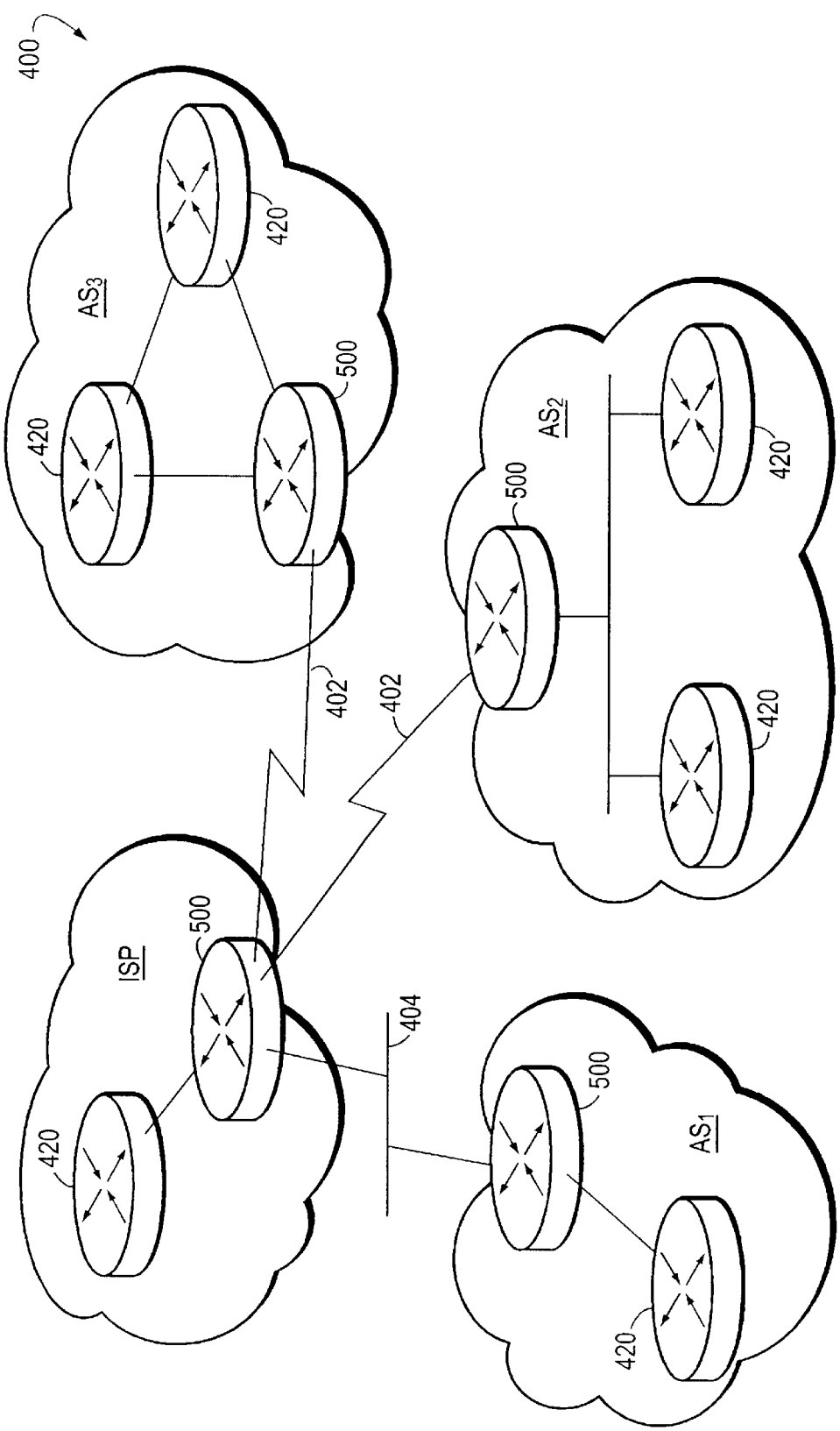
FIG. 4 is a schematic block diagram of a computer network comprising a plurality of autonomous systems interconnected by intermediate nodes, such as BGP interdomain routers.

FIG. 4 is a schematic block diagram of a computer network 400 comprising a plurality of autonomous systems or routing domains interconnected by intermediate nodes, such as conventional intradomain routers 420 and interdomain routers 500. The autonomous systems may include an Internet Service Provider (ISP) domain and various routing domains ($AS_{1-3}$) interconnected by the interdomain routers. The interdomain routers 500 are further interconnected by shared medium networks, such as local area networks (LANs) and point-to-point links, such as frame relay links, asynchronous transfer mode links or other serial links. Communication among the routers is typically effected by exchanging discrete data frame or packets in accordance with pre-defined protocols, such as the Transmission Control Protocol/Internet Protocol (TCP/IP). It will be understood to those skilled in the art that other protocols, such as the Internet Packet Exchange (IPX) protocol, may be advantageously used with the present invention.

Figure 5:
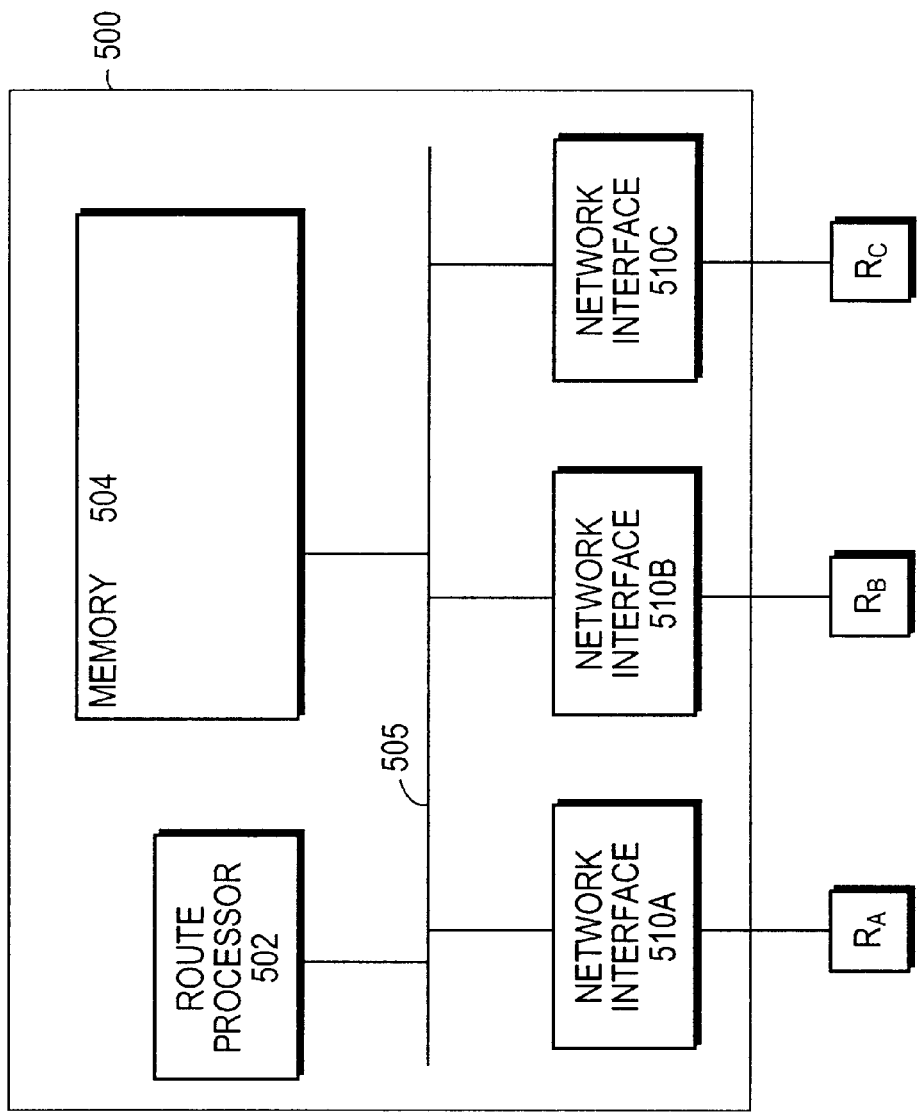
FIG. 5 is a schematic block diagram of an embodiment of an interdomain router comprising a route processor coupled to a memory and a plurality of network interfaces.

Each router typically comprises a plurality of interconnected elements, such as a processor, a memory and a network interface adapter. FIG. 5 is a schematic block diagram of an interdomain router 500 comprising a route processor 502 coupled to a memory 504 and a plurality of network interface adapters $510_{A-C}$ via a bus 505. The memory 504 may comprise storage locations addressable by the processor and interface adapters for storing software programs and data structures associated with the inventive dynamic capabilities mechanism and technique. The route processor 502 may comprise processing elements or logic for executing the software programs and manipulating the data structures. An operating system, portions of which are typically resident in memory 504 and executed by the route processor, functionally organizes the router by, inter alia, invoking network operations in support of software processes executing on the router. It will be apparent to those skilled in the art that other processor and memory means, including various computer readable media, may be used for storing and executing program instructions pertaining to the inventive technique described herein.

Figure 6:
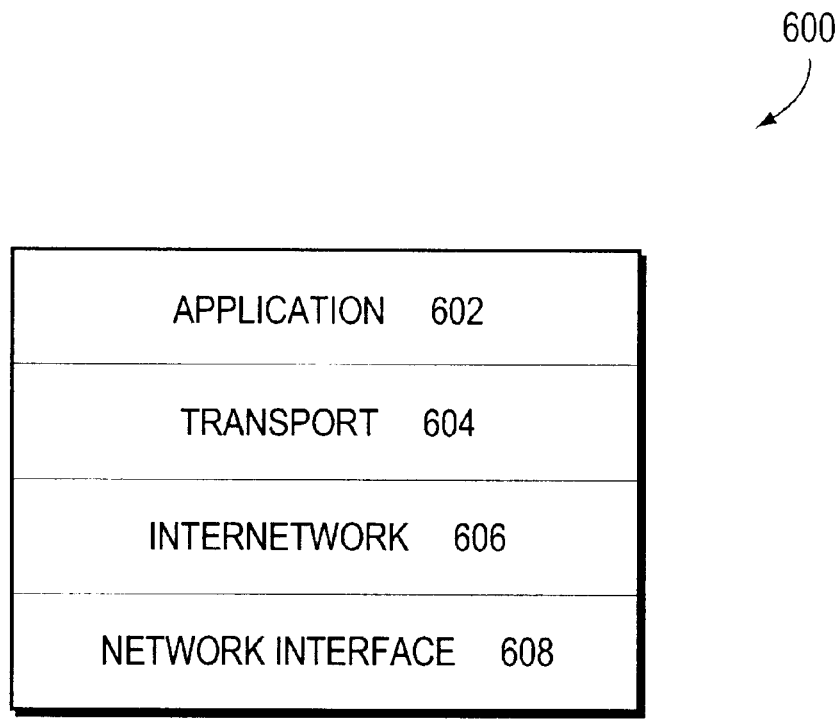
FIG. 6 is a schematic block diagram of a conventional protocol stack, such as the Internet communications protocol stack, within the interdomain router of FIG. 5.

A key function of the interdomain router 500 is determining the next node to which a packet is sent; in order to accomplish such "routing" the interdomain routers cooperate to determine optimal paths through the computer network 400. The routing function is preferably performed by an internetwork layer of a conventional protocol stack within each router. FIG. 6 is a schematic block diagram of a conventional protocol stack, such as the Internet communications protocol stack 600. The architecture of the Internet protocol stack is represented by 4 layers termed, in ascending interfacing order, the network interface layer 608, the internetwork layer 606, the transport layer 604 and the application layer 602.

The lower network interface layer 608 is generally standardized and implemented in hardware and firmware, whereas the higher layers are typically implemented in the form of software. The primary internetwork layer protocol of the Internet architecture is the Internet Protocol (IP). IP is primarily a connectionless protocol that provides for internetwork routing, fragmentation and reassembly of exchanged packets—generally referred to as "datagrams" in an Internet environment—and which relies of transport protocols for end-to-end reliability. An example of such a transport protocol is the Transmission Control Protocol (TCP) which is implemented by the transport layer 604 and provides connection-oriented services to the upper layer protocols of the Internet architecture. The term TCP/IP is commonly used to denote the Internet architecture.

In particular, the internetwork layer 606 concerns the protocol and algorithms that interdomain routers utilize so that they can cooperate to calculate paths through the computer network 400. An interdomain routing protocol, such as the Border Gateway Protocol (BGP-4), is used to perform interdomain routing (for the internetwork layer) through the computer network. The interdomain routers 500 (hereinafter "neighboring peer routers") exchange routing and reachability information among the autonomous systems over a reliable transport layer connection, such as TCP. The BGP protocol "runs" on top of the transport layer to ensure reliable communication among the neighboring routers.

Figure 7:
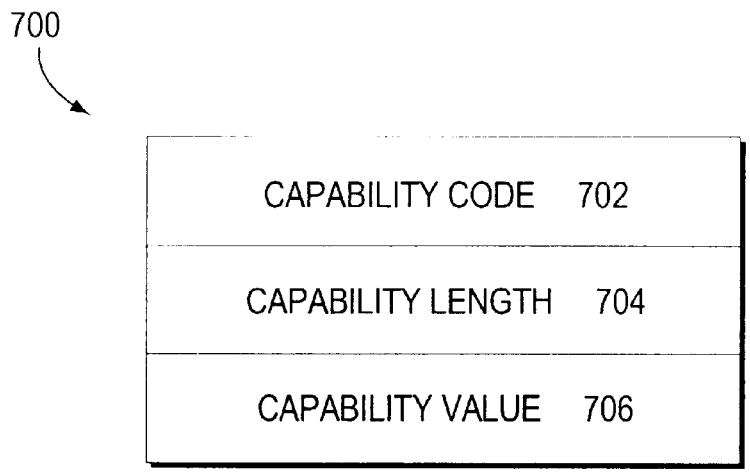
FIG. 7 is a schematic block diagram of the format of a capabilities optional parameter contained in the optional parameters field of FIG. 3.

After a TCP connection is established the first message sent by the neighboring peer routers is an OPEN message. As noted, the OPEN message data structure provides a means for the routers to identify themselves at the beginning of the neighboring relationship. The OPEN message includes, inter alia, an optional parameters field that contains a list of optional parameters specified by the peer routers. One optional parameter that is defined within the optional parameter field is a capabilities parameter used to introduce new features that may be supported by a peer router. FIG. 7 is a schematic block diagram of the format of a capabilities optional parameter 700 comprising a 1-byte capability code field 702, a 1-byte capability length field 704 and a variable-length capability value field 706. The capabilities optional parameter structure (type 2) is described in *Internet Draft* <draft-ietf-idr-bgp4-cap-neg-03.txt>titled, *Capabilities Negotiation with BGP-4*, by R. Chandra and J. G. Scudder (February 1999), which is hereby incorporated by reference as though fully set forth herein.

As noted, the capabilities optional parameter 700 is used by a BGP speaker to convey to its BGP peer a list of capabilites supported by the speaker. Examples of such capabilities defined by the BGP-4 protocol include (i) a multiprotocol extension capability described in *Internet Draft*<draft-ietf-idr-bgp4-multiprotocol-v2-02.txt>titled, *Multiprotocol Extensions for BGP-4*, by R. Chandra et al. (February *1999*); and (ii) a route refresh capability described in *Internet Draft*<draft-chen-bgp-route-refresh-01.txt>titled, *Route Refresh Capability for BGP-4*, by E. Chen (February 1999), each of which is hereby incorporated by reference as though fully set forth herein. The multiprotocol extension capability allows BGP-4 to carry address families other than IPv4 unicast (e.g., IPv4 multicast), whereas the route refresh capability, which is used when a router changes its routing policy, advertises the ability of a router to receive a route refresh message from its neighbor.

A problem with the conventional OPEN message exchange is that the capabilities supported by the peer routers can only be advertised at the time the BGP peering relationship is established. For example, assume that the BGP peer relationship between routers A and B is configured such that router A can perform routing operations for both IPv4 unicast and IPv4 multicast address families, whereas router B can only perform routing operations for the IPv4 unicast address family. During the OPEN message exchange, router A advertises its ability to perform routing operations for both IPv4 unicast and IPv4 multicast address families, while router B can initially only advertise its ability to perform routing operations for the IPv4 unicast address family. Later if router B is configured to perform routing operations for the IPv4 multicast address family, the BGP session (i.e., TCP connection) between routers A and B must be reset; that is, closed (via a conventional TCP Close message exchange) and then re-opened. At this time router B will advertise its ability to support routing operations for both IPv4 unicast and IPv4 multicast address families via the capabilities optional parameter field 300 within the OPEN message 200. Thereafter at any time during the session between routers A and B, the peer routers can exchange messages related to IPv4 unicast or IPv4 multicast address families. Closing of a TCP peer connection is disruptive because of a loss of connectivity between the two routers, which may interrupt existing services between the routers. The present invention is directed to solving this problem.

Specifically, the present invention comprises a technique for dynamically exchanging or updating routing capabilities between neighboring peer routers in a computer network without terminating a peer connection between the routers, which action may result in disruption to the operation of the routers. According to the present invention, a novel dynamic capability parameter is defined that enables a router to advertise a new capability, or revise or remove a previously announced capability, to a neighboring router when a peer connection is established between the routers. The dynamic capability parameter is a data structure preferably embodied as a new BGP capability parameter having a capability code and length that conforms to the format of capabilities optional parameter 700 shown in FIG. 7.

Figure 8:
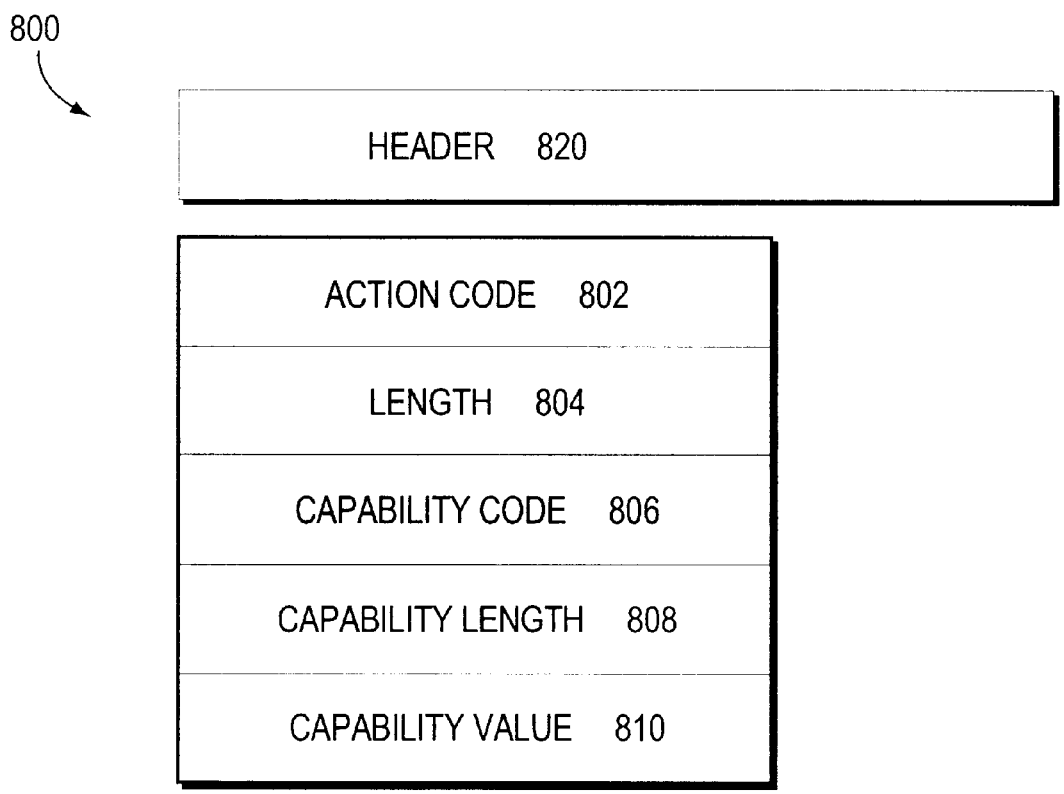
FIG. 8 is a schematic block diagram of a novel BGP capability message according to the present invention.

The dynamic capability is used by a BGP speaker to announce to its peer router that it is capable of receiving and properly handling a dynamic capabilities message after the BGP session has been established. That is once advertised, the dynamic capability parameter facilitates graceful capability changes between neighboring routers by allowing the routers to exchange a novel capability message data structure. FIG. 8 is a schematic block diagram of the format of a BGP capability message 800 which includes a fixed-size BGP header 820 prepended to various capability message fields. The BGP capability message 800 is preferably embodied as a new BGP message type (see RFC 1771, section 4.1).

The capability message fields comprise a 1-byte capability action code field 802, a 1-byte length field 804, a 1-byte capability code field 806, a 1-byte capability length field 808 and a variable-length capability value field 810. In the illustrative embodiment, the capability action code contained in field 802 has the following defined values: (1) announce (i.e., add) a new capability; (2) replace a previously announced capability; and (3) withdraw (i.e., delete) a previously announced capability. It should be noted that the capability message structure 800 may comprise multiple copies of the capability message fields 802–810 appended to a single BGP header 820.

Advantageously, the dynamic capability identifies the BGP speaker as being capable of receiving this BGP capability message after the BGP session has been established. Moreover, the novel capability message dynamically announces updates of capabilities without the need for resetting the existing peer connection. As a result, the inventive technique allows non-disruptive configuration and enabling of capabilities in a manner that improves network stability, while reducing interruption of network services.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method for dynamically exchanging or updating routing capabilities between neighboring peer routers in a computer network, the method comprising the steps of:

establishing a peer connection between one of the neighboring routers and another of the neighboring routers;

announcing the ability to support a new capability, or revise or remove a previously announced capability, from the one of the neighboring routers to the other of the neighboring routers while the peer connection is established; and exchanging a capability message between the one of the neighboring routers and the other of the neighboring routers to thereby facilitate graceful capability changes between the routers without terminating the peer connection.

2. The method of claim 1 wherein the peer connection is a border gateway protocol (BGP) peer connection and wherein the step of establishing comprises the steps of:

exchanging transmission control protocol (TCP) segments between the neighboring routers; and identifying the neighboring routers through the exchange of a BGP open message.

3. The method of claim 2 wherein the step of announcing comprises the step of providing a dynamic capability parameter stored within an optional parameters field of the open message.

4. The method of claim 3 wherein the step of providing a dynamic capability parameter comprises the step of embodying the dynamic capability parameter as a BGP capability parameter having a code and length that conforms to a format of a capabilities optional parameter.

5. The method of claim 4 wherein the step of announcing further comprises the step of announcing an ability to receive and properly handle the capability message after the BGP peer connection is established.

6. The method of claim 5 wherein the step of exchanging the capability message further comprises the step of providing a plurality of defined values for storage within a capability action code field of the capability message.

7. The method of claim 6 wherein one of the plurality of defined values comprises a defined value for adding a new capability.

8. The method of claim 7 wherein another of the plurality of defined values comprises a defined value for replacing a previous announced capability.

9. The method of claim 8 wherein yet another of the plurality of defined values comprises a defined value for deleting a previously announced capability.

10. A memory device for use in dynamically exchanging or updating routing capabilities between neighboring peer routers in a computer network, the memory device containing data structures comprising:

a transmission control protocol (TCP) segment;

an open message cooperating with the TCP segment to establish a peer connection between the neighboring routers; and a dynamic capability parameter stored within an optional parameters field of the open message, the dynamic capability parameter announcing the ability of a neighboring peer router to receive and properly handle a capability message after the peer connection is established.

11. The memory device of claim 10 wherein the capability message comprises a capability action code field for storing one of a plurality of defined values.

12. The memory device of claim 11 wherein one of the plurality of defined values comprises a defined value for adding a new capability.

13. The memory device of claim 12 wherein another of the plurality of defined values comprises a defined value for replacing a previous announced capability.

14. The memory device of claim 13 wherein yet another of the plurality of defined values comprises a defined value for deleting a previously announced capability.

15. Apparatus for dynamically exchanging or updating routing capabilities between neighboring peer routers in a computer network, the apparatus comprising:

a route processor of one of the neighboring routers, the route processor programmed to generate a transmission control protocol (TCP) segment and an open message for exchange with a processor of its neighboring router to establish a peer connection between the neighboring routers; and a memory device operably connected to the processor for storing the TCP segment and open message, the open message having an optional parameters field for storing a capability optional parameter, the processor further programmed to generate a dynamic capability parameter for storage within the optional parameters field, the dynamic capability parameter announcing an ability of the one neighboring peer router to receive and properly handle a capability message after the peer connection is established.

16. A computer readable medium containing executable program instructions for dynamically exchanging or updating routing capabilities between neighboring peer routers in a computer network, the executable instructions comprising program instructions for:

establishing a peer connection between the neighboring routers;

announcing the ability to support a new capability, or revise or remove a previously announced capability, from one of the neighboring routers to the other of the neighboring routers while the peer connection is established; and exchanging a capability message between the neighboring routers to thereby facilitate graceful capability changes between the routers without terminating the peer connection.

17. The computer readable medium of claim 16 wherein the peer connection is a border gateway protocol (BGP) peer connection and wherein the program instructions for establishing comprises program instructions for:

exchanging transmission control protocol (TCP) segments between the neighboring routers; and identifying the neighboring routers through the exchange of a BGP open message.

18. The computer readable medium of claim 17 wherein the program instructions for announcing comprises program instructions for providing a dynamic capability parameter stored within an optional parameters field of the open message.

19. The computer readable medium of claim 18 wherein the program instructions for providing a dynamic capability parameter comprises the step of embodying the dynamic capability parameter as a BGP capability parameter having a code and length that conforms to a format of a capabilities optional parameter.

20. The computer readable medium of claim 19 wherein the program instructions for announcing further comprises program instructions for announcing an ability to receive and properly handle the capability message after the BGP peer connection is established.

21. A router comprising:
means for establishing a peer connection between said router and a neighboring router in a computer network, said connection having a first capability;
means for announcing an ability to support a new capability, or revise or remove said first capability, from said router to said neighboring router while said peer connection is established; and
means for exchanging a capability message between said router and said neighboring router to thereby facilitate capability changes between said router and said neighboring router without terminating said peer connection.

22. The router of claim 21 further comprising:
means for receiving a received capability message, and in response, changing said first capability.

23. A method for operating a router comprising the steps of:
establishing a peer connection between said router and a neighboring router in a computer network, said connection having a first capability;
announcing an ability to support a new capability, or revise or remove said first capability while said peer connection is established; and
exchanging a capability message between said router and said neighboring router to thereby facilitate capability changes between said router and said neighboring router without terminating said peer connection.

24. The router of claim 23 further comprising the step of:
receiving a received capability message, and in response, changing said first capability.

25. A router comprising:
a route processor to establish a peer connection between said router and a neighboring router in a computer network, said connection having a first capability;
a processor to select a new capability, or revise or remove said first capability while said peer connection is established; and
a network interface to exchange a capability message, said capability message generated by said processor, between said router and said neighboring router to thereby facilitate capability changes between said router and said neighboring router without terminating said peer connection.

26. The router of claim 25 further comprising:
said network interface receiving a received capability message, and in response, said processor changing said first capability.

* * * * *

UNITED STATES PATENT AND TRADEMARK OFFICE
CERTIFICATE OF CORRECTION

PATENT NO.    : 6,553,423 B1
DATED         : April 22, 2003
INVENTOR(S)   : Noble et al.

It is certified that error appears in the above-identified patent and that said Letters Patent is hereby corrected as shown below:

<u>Title page, Item [54] and Column 1, lines 1-5,</u>
Please correct title to read:
-- METHOD AND APPARATUS FOR DYNAMIC EXCHANGE OF CAPABILITIES BETWEEN ADJACENT/NEIGHBORING NETWORK NODES --.

Signed and Sealed this

Twelfth Day of August, 2003

JAMES E. ROGAN
*Director of the United States Patent and Trademark Office*